United States Patent
Watanabe

(10) Patent No.: US 11,286,324 B2
(45) Date of Patent: Mar. 29, 2022

(54) CARBOXYL GROUP-CONTAINING NITRILE RUBBER, METHOD FOR PRODUCTION SAME, CROSSLINKABLE NITRILE RUBBER COMPOSITION, AND CROSSLINKED RUBBER

(71) Applicant: ZEON CORPORATION, Tokyo (JP)

(72) Inventor: Yasuaki Watanabe, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 196 days.

(21) Appl. No.: 16/471,009

(22) PCT Filed: Dec. 19, 2017

(86) PCT No.: PCT/JP2017/045568
§ 371 (c)(1),
(2) Date: Jun. 19, 2019

(87) PCT Pub. No.: WO2018/123737
PCT Pub. Date: Jul. 5, 2018

(65) Prior Publication Data
US 2020/0087434 A1    Mar. 19, 2020

(30) Foreign Application Priority Data
Dec. 27, 2016   (JP) .............................. JP2016-253628

(51) Int. Cl.
C08F 236/06    (2006.01)
C08C 19/00    (2006.01)
C08C 1/15    (2006.01)
C08C 3/02    (2006.01)

(52) U.S. Cl.
CPC .............. *C08F 236/06* (2013.01); *C08C 1/15* (2013.01); *C08C 3/02* (2013.01); *C08C 19/00* (2013.01); *C08F 2800/20* (2013.01); *C08F 2810/20* (2013.01)

(58) Field of Classification Search
CPC .............. C08F 236/06; C08F 2810/20; C08F 2800/02; C08C 19/00; C08C 3/02; C08C 1/15
See application file for complete search history.

(56) References Cited

U.S. PATENT DOCUMENTS 8,742,006 B2    6/2014   Nagamori et al.
2017/0253729 A1*  9/2017  Nakashima .............. C08L 15/00
2017/0327672 A1   11/2017  Inoue et al.

FOREIGN PATENT DOCUMENTS

JP    2009-203272 A    9/2009
WO    2007/049651 A1   5/2007
WO    2016/031848 A1   3/2016
WO    2016/084734 A1   6/2016

OTHER PUBLICATIONS

Jan. 25, 2021 Office Action issued in Indian Patent Applicaiton No. 201917024364.
Dec. 28, 2020 Office Action issued in Russian Patent Application No. 2019118979/04(036555).
Oct. 9, 2020 Extended European Search Report issued in European Patent Application No. 17885780.1.
Jul. 2, 2019 International Preliminary Report on Patentability issued in International Patent Application No. PCT/JP2017/045568.
"Processing and Use of Nitrile Rubber", Shandong Chemical Engineering Institute Rubber Technology Education and Research Group, Petrochemical Industry Publishing Co., Ltd., p. 4, 1978.
Mar. 6, 2018 International Search Report issued in International Patent Application No. PCT/JP2017/045568.
Aug. 31, 2021 Office Action issued in Brazil Application BR112019012610.
Oct. 18, 2021 Office Action issued in Chinese Patent Application No. 201780078082.3.

* cited by examiner

Primary Examiner — Robert D Harlan
(74) Attorney, Agent, or Firm — Oliff PLC

(57) ABSTRACT

A carboxyl group-containing nitrile rubber comprising an α,β-ethylenically unsaturated nitrile monomer unit in a content of 5 to 60 wt % and having an iodine value of 120 or less, wherein the carboxyl group-containing nitrile rubber has a polymer Mooney viscosity (ML1+4, 100° C.) of 60 or less and a polymer pH of 7 or less.

9 Claims, No Drawings

CARBOXYL GROUP-CONTAINING NITRILE RUBBER, METHOD FOR PRODUCTION SAME, CROSSLINKABLE NITRILE RUBBER COMPOSITION, AND CROSSLINKED RUBBER

TECHNICAL FIELD

The present invention relates to a carboxyl group-containing nitrile rubber having an excellent formability when a cross-linking agent is added as well as being capable of giving a cross-linked rubber excellent in the original state physical properties, compression set resistance and water resistance, and a production method thereof, and to a cross-linkable nitrile rubber composition and a cross-linked rubber obtained by using such a carboxyl group-containing nitrile rubber.

BACKGROUND ART

Nitrile rubbers (acrylonitrile-butadiene copolymer rubbers) have hitherto been used, by taking advantage of the oil resistance, mechanical properties, chemical resistance and the like thereof, as the materials for vehicle rubber components such as hoses and tubes; hydrogenated nitrile rubbers (hydrogenated acrylonitrile-butadiene copolymer rubbers) obtained by hydrogenating the carbon-carbon double bonds in the polymer main chains of nitrile rubbers are more excellent in heat resistance, and accordingly are used as rubber components such as belts, hoses and diaphragms.

As such a nitrile rubber, for example, Patent Document 1 discloses a nitrile rubber which is obtained by coagulating the latex of a copolymer rubber using an aluminum-containing coagulant, a magnesium-containing coagulant or a calcium-containing coagulant, has a content of an $\alpha,\beta$-ethylenically unsaturated nitrile monomer unit of 10 to 60 wt %, comprises an $\alpha,\beta$-ethylenically unsaturated dicarboxylic acid monoester monomer unit, and has an iodine value of 120 or less. According to the nitrile rubber described in Patent Document 1, there is obtained a cross-linked rubber improved in compression set resistance to some extent; however, in terms of accomplishment of a recent request of high-performance, the further improvement of the compression set resistance has been demanded. Also, the nitrile rubber described in Patent Document 1 has a relatively high viscosity when a cross-linking agent is added (compound Mooney viscosity), therefore, in terms of enhancement of the formability, improvement of the formability has also been desired.

RELATED ART DOCUMENTS

Patent Documents

Patent Document 1: WO 2007/049651

SUMMARY OF THE INVENTION

Problem to be Solved by the Invention

The present invention was made in view of such a circumstance, and an object of the present invention is to provide a carboxyl group-containing nitrile rubber having an excellent formability when a cross-linking agent is added as well as being capable of giving a cross-linked rubber excellent in the original state physical properties, compression set resistance and water resistance. Also, an object of the present invention is to provide a cross-linkable nitrile rubber composition and a cross-linked rubber obtained by using such a carboxyl group-containing nitrile rubber.

Means for Solving the Problem

The present inventors engaged in a diligent study to achieve the above objects, and consequently have completed the present invention by discovering that the above object can be achieved by controlling the polymer Mooney viscosity and polymer pH within specific ranges for a carboxyl group-containing nitrile rubber comprising an $\alpha,\beta$-ethylenically unsaturated nitrile monomer unit in a content of 5 to 60 wt % and having an iodine value of 120 or less.

Specifically, the present invention provides a carboxyl group-containing nitrile rubber comprising an $\alpha,\beta$-ethylenically unsaturated nitrile monomer unit in a content of 5 to 60 wt % and having an iodine value of 120 or less, wherein the carboxyl group-containing nitrile rubber has a polymer Mooney viscosity (ML1+4, 100° C.) of 60 or less and a polymer pH of 7 or less.

The carboxyl group-containing nitrile rubber of the present invention preferably has a sodium content of 10,000 ppm by weight or less.

The carboxyl group-containing nitrile rubber of the present invention preferably comprises a carboxyl group-containing monomer unit in a content of 1 to 30 wt %. The carboxyl group-containing nitrile rubber of the present invention preferably comprises a conjugated diene monomer unit in a content of 20-89.9 wt %.

The present invention also provides a cross-linkable nitrile rubber composition comprising the above-mentioned carboxyl group-containing nitrile rubber and a cross-linking agent.

Moreover, the present invention provides a cross-linked rubber obtained by cross-linking the cross-linkable nitrile rubber composition.

Further, the present invention provides a method for producing the above-mentioned carboxyl group-containing nitrile rubber, comprising adding a salt of a monovalent cation to a latex of the carboxyl group-containing nitrile rubber to coagulate the carboxyl group-containing nitrile rubber.

In the method for producing the carboxyl group-containing nitrile rubber of the present invention, the salt is preferably sodium chloride, sodium nitrate or sodium sulfate.

In the method for producing the carboxyl group-containing nitrile rubber of the present invention, a pH of the latex is preferably 5.5 or less.

The method for producing the carboxyl group-containing nitrile rubber of the present invention preferably further comprises, after the coagulation of the carboxyl group-containing nitrile rubber, water-washing a water-containing crumb of the carboxyl group-containing nitrile rubber obtained by coagulation.

Effects of Invention

The present invention can provide a carboxyl group-containing nitrile rubber having an excellent formability when a cross-linking agent is added as well as being capable of giving a cross-linked rubber excellent in the original state physical properties, compression set resistance and water resistance, and a production method thereof, and a cross-linkable nitrile rubber composition and a cross-linked rubber obtained by using such a carboxyl group-containing nitrile rubber.
}

DESCRIPTION OF EMBODIMENTS

Carboxyl Group-Containing Nitrile Rubber

The carboxyl group-containing nitrile rubber of the present invention is a rubber containing an α,β-ethylenically unsaturated nitrile monomer unit in a content of 5 to 60 wt % and having an iodine value of 120 or less, a polymer Mooney viscosity (M1+4, 100° C.) of 60 or less and a polymer pH of 7 or less.

The carboxyl group-containing nitrile rubber of the present invention can be obtained, for example, by copolymerizing an α,β-ethylenically unsaturated nitrile monomer, a carboxyl group-containing monomer, and a copolymerizable other monomer added according to the need.

The α,β-ethylenically unsaturated nitrile monomer is not particularly limited so long as the α,β-ethylenically unsaturated nitrile monomer is an α,β-ethylenically unsaturated compound having a nitrile group. For example, acrylonitrile; α-halogenoacrylonitriles such as α-chloroacrylonitrile and α-bromoacrylonitrile; α-alkylacrylonitriles such as methacrylonitrile and ethacrylonitrile, etc. may be mentioned. Among these, acrylonitrile and methacrylonitrile are preferable, and acrylonitrile is particularly preferable. The α,β-ethylenically unsaturated nitrile monomers may be used as single types alone or as a plurality of types combined.

The content of the α,β-ethylenically unsaturated nitrile monomer unit is 5 to 60 wt %, preferably 10 to 50 wt %, more preferably 15 to 50 wt %, in all the monomer units. When the content of the α,β-ethylenically unsaturated nitrile monomer unit is too small, the oil resistance of the obtained cross-linked rubber is liable to decrease. Conversely, when the content of the α,β-ethylenically unsaturated nitrile monomer unit is too large, there is a possibility that the cold resistance of the obtained cross-linked rubber decreases.

The carboxyl group-containing monomer is not particularly limited as long as the carboxyl group-containing monomer is capable of copolymerizing with an α,β-ethylenically unsaturated nitrile monomer and is a monomer containing one or more unsubstituted (free) carboxyl groups which are not esterified. The unsubstituted carboxyl group is used mainly for cross-linking. Having a carboxyl group-containing monomer unit can make the obtained cross-linked rubber excellent in the compression set resistance.

As the carboxyl group-containing monomer, for example, an α,β-ethylenically unsaturated monocarboxylic acid monomer, an α,β-ethylenically unsaturated polyvalent carboxylic acid monomer, and an α,β-ethylenically unsaturated dicarboxylic acid monoester monomer, etc. may be mentioned. A carboxyl group-containing monomer also includes a monomer in which a carboxyl group forms a carboxylic acid salt. In addition, since an anhydride of an α,β-ethylenically unsaturated polyvalent carboxylic acid cleaves an acid anhydride group to form a carboxyl group after copolymerization, it can also be used as a carboxyl group-containing monomer.

As the α,β-ethylenically unsaturated monocarboxylic acid monomer, acrylic acid, methacrylic acid, ethylacrylic acid, crotonic acid, cinnamic acid, etc. may be mentioned.

As the α,β-ethylenically unsaturated polyvalent carboxylic acid monomer, butenedioic acids such as fumaric acid and maleic acid, itaconic acid, citraconic acid, mesaconic acid, glutaconic acid, allylmalonic acid, teraconic acid, etc. may be mentioned. As the anhydride of the α,β-unsaturated polyvalent carboxylic acid, maleic anhydride, itaconic anhydride, citraconic anhydride, etc. may be mentioned.

As the α,β-ethylenically unsaturated dicarboxylic acid monoester monomer, maleic acid monoalkyl ester such as monomethyl maleate, monoethyl maleate, monopropyl maleate, and mono-n-butyl maleate; maleic acid monocycloalkyl esters such as monocyclopentyl maleate, monocyclohexyl maleate, and monocycloheptyl maleate; maleic acid monoalkyl cycloalkyl esters such as monomethyl cyclopentyl maleate and monoethyl cyclohexyl maleate; fumaric acid monoalkyl esters such as monomethyl fumarate, monoethyl fumarate, monopropyl fumarate, and mono-n-butyl fumarate; fumaric acid monocycloalkyl esters such as monocyclopentyl fumarate, monocyclohexyl fumarate, and monocycloheptyl fumarate; fumaric acid monoalkyl cycloalkyl esters such as monomethyl cyclopentyl fumarate and monoethyl cyclohexyl fumarate; citraconic acid monoalkyl esters such as monomethyl citraconate, monoethyl citraconate, monopropyl citraconate, and mono-n-butyl citraconate; citraconic acid monocycloalkyl esters such as monocyclopentyl citraconate, monocyclohexyl citraconate, and monocycloheptyl citraconate; citraconic acid monoalkyl cycloalkyl esters such as monomethyl cyclopentyl citraconate and monoethyl cyclohexyl citraconate; itaconic acid monoalkyl esters such as monomethyl itaconate, monoethyl itaconate, monopropyl itaconate, and mono-n-butyl itaconate; itaconic acid monocycloalkyl esters such as monocyclopentyl itaconate, monocyclohexyl itaconate, and monocycloheptyl itaconate; itaconic acid monoalkyl cycloalkyl esters such as monomethyl cyclopentyl itaconate, and monoethyl cyclohexyl itaconate; etc. may be mentioned.

The carboxyl group-containing monomers may be used as single types alone or as a plurality of types combined. Among these, because of being able to obtain even more significant effects of the present invention, the α,β-ethylenically unsaturated dicarboxylic acid monoester monomer is preferable, the maleic acid monoalkyl ester is more preferable, and mono-n-butyl maleate is particularly preferable. The number of carbon atoms of the alkyl group of the above-mentioned maleic acid monoalkyl ester is preferably 2 to 8.

The content of the carboxyl group-containing monomer unit is preferably 1 to 30 wt %, more preferably 2 to 25 wt %, still more preferably 2 to 20 wt %, in all the monomer units. By setting the content of the carboxyl group-containing monomer unit within the above-mentioned range, it is possible to make the obtained cross-linked rubber good in compression set resistance.

In addition, the carboxyl group-containing nitrile rubber of the present invention preferably comprises a conjugated diene monomer unit so that the obtained cross-linked product has rubber elasticity.

As the conjugated diene monomer forming the conjugated diene monomer unit, conjugated diene monomer having 4 to 6 carbon atoms such as 1,3-butadiene, isoprene, 2,3-dimethyl-1,3-butadiene, 1,3-pentadiene, and chloroprene is preferable, 1,3-butadiene and isoprene are more preferable, and 1,3-butadiene is particularly preferable. The conjugated diene monomers may be used as single types alone or as a plurality of types combined.

The content of the conjugated diene monomer unit (including hydrogenated parts) is preferably 20 to 89.9 wt %, more preferably 35 to 89.8 wt %, still more preferably 40 to 84.5 wt %, and particularly preferably 40 to 60 wt % in all the monomer units. By setting the content of the conjugated diene monomer unit within the above-mentioned range, it is possible to make the obtained cross-linked rubber excellent in the rubber elasticity while maintaining a good heat resistance and chemical stability.

Further, the carboxyl group-containing nitrile rubber of the present invention may also include, in addition to the α,β-ethylenically unsaturated nitrile monomer unit, the carboxyl group-containing monomer unit, and the conjugated diene monomer unit, other monomer units copolymerizable with the monomers forming these. As such other monomers, an α,β-ethylenically unsaturated monocarboxylic ester monomer, ethylene, an α-olefin monomer, an aromatic vinyl monomer, a fluorine-containing vinyl monomer, a copolymerizable antiaging agent, etc. may be mentioned.

As the α,β-ethylenically unsaturated monocarboxylic ester monomer, (meth)acrylic acid esters (abbreviations for "methacrylic acid esters and acrylic acid esters," and the same shall apply hereinafter) each having an alkyl group having 1 to 18 carbon atoms such as methyl acrylate, ethyl acrylate, n-butyl acrylate, isobutyl acrylate, n-dodecyl acrylate, methyl methacrylate, and ethyl methacrylate; (meth)acrylic acid esters each having an alkoxyalkyl group having 2 to 18 carbon atoms, such as methoxymethyl acrylate, methoxyethyl acrylate, ethoxypropyl acrylate, methoxybutyl acrylate, ethoxydodecyl acrylate, methoxyethyl methacrylate, methoxybutyl methacrylate, ethoxypentyl methacrylate; (meth)acrylic acid esters each having a cyanoalkyl group having 2 to 12 carbon atoms such as α-cyanoethyl acrylate, α-cyanoethyl methacrylate, and cyanobutyl methacrylate; (meth)acrylic acid esters each having a hydroxyalkyl group having 1 to 12 carbon atoms such as 2-hydroxyethyl acrylate, 2-hydroxypropyl acrylate, and 2-hydroxyethyl methacrylate; and (meth)acrylic acid esters each having a fluoroalkyl group having 1 to 12 carbon atoms such as trifluoroethyl acrylate and tetrafluoropropyl methacrylate, etc. may be mentioned.

The α-olefin monomer preferably has 3 to 12 carbon atoms, and, for example, propylene, 1-butene, 4-methyl-1-pentene, 1-hexene, 1-octene, etc. may be mentioned.

As the aromatic vinyl monomer, styrene, α-methylstyrene, vinylpyridine, etc. may be mentioned.

As the fluorine-containing vinyl monomer, fluoroethyl vinyl ether, fluoropropyl vinyl ether, o-trifluoromethylstyrene, vinyl pentafluorobenzoate, difluoroethylene, tetrafluoroethylene, etc. may be mentioned.

As the copolymerizable antiaging agent, N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy)aniline, etc. may be mentioned.

These copolymerizable other monomers may be used as a plurality of types combined. The content of the other monomer unit(s) is preferably 50 wt % or less, more preferably 45 wt % or less, and still more preferably 40 wt % or less, in all the monomer units forming the carboxyl group-containing nitrile rubber.

The carboxyl group-containing nitrile rubber of the present invention preferably comprises an α,β-ethylenically unsaturated monocarboxylic ester monomer unit as the other monomer unit. The content of the α,β-ethylenically unsaturated monocarboxylic ester monomer unit is preferably 0.1 to 74 wt %, more preferably 3.5 to 53 wt %, and still more preferably 13 to 45 wt % in all the monomer unit. By setting the content of the α,β-ethylenically unsaturated monocarboxylic ester monomer unit within the above-mentioned range, it is possible to make the obtained cross-linked rubber more excellent in oil resistance and cold resistance.

The iodine value of the carboxyl group-containing nitrile rubber of the present invention is 120 or less, preferably 80 or less, more preferably 70 or less, particularly preferably 60 or less. When the iodine value of the carboxyl group-containing nitrile rubber is too high, the heat resistance and the ozone resistance of the obtained cross-linked rubber are liable to decrease.

The carboxyl group-containing nitrile rubber of the present invention has a polymer Mooney viscosity (ML1+4, 100° C.) of 60 or less and a polymer pH of 7 or less. According to the present invention, the content of the α,β-ethylenically unsaturated nitrile monomer unit and the iodine value of the carboxyl group-containing nitrile rubber are set within particular ranges, and the polymer Mooney viscosity is controlled to be 60 or less and the polymer pH is controlled to be 7 or less, which can provide excellent formability when a cross-linking agent is added, and moreover, can make the obtained cross-linked rubber excellent in the original state physical properties, compression set resistance, and water resistance.

The polymer Mooney viscosity (ML1+4, 100° C.) is 60 or less, preferably 55 or less, more preferably 50 or less, and the lower limit of the polymer Mooney viscosity is not particularly limited, but preferably 15 or more. Further, the polymer pH is 7 or less, preferably 6.7 or less, more preferably 6.5 or less, and the lower limit of the polymer pH is not particularly limited, but preferably 2 or more. When the polymer Mooney viscosity or polymer pH is too high, the viscosity when a cross-linking agent is added (compound Mooney viscosity) increases, leading to reduction of the formability and deterioration of the compression set resistance and the water resistance when a cross-linked rubber is formed. The method of setting the polymer Mooney viscosity and the polymer pH within the above-mentioned range includes, but not particularly limited to, adjusting the pH for coagulation in coagulating the carboxyl group-containing nitrile rubber obtained by emulsion polymerization, selecting the type of a coagulant used for coagulation and the like.

In the present invention, the polymer pH refers to the pH of a component included in a dried rubber, and can be obtained by the following method for example. Specifically, 6 g of a dried rubber is dissolved in 100 g of a solvent (e.g., tetrahydrofuran) that can dissolve it, forming a rubber solution. Then, 2.0 ml of distilled water is added to the obtained rubber solution, then the resultant is mixed and stirred to obtain a solution. The polymer pH can be obtained by measuring the pH of the obtained solution. The solvent for dissolving a rubber is preferably tetrahydrofuran.

Further, in tams of preventing increase of the viscosity in the case of adding a cross-linking agent (compound Mooney viscosity) more appropriately, and enhancing the water resistance more appropriately in the case of forming a cross-linked rubber, the sodium content is preferably 10,000 ppm by weight or less, more preferably 5,000 ppm by weight or less, still more preferably 3,000 ppm by weight, and the lower limit is not particularly limited, but may be 300 ppm by weight or more, 500 ppm by weight or more, or 700 ppm by weight or more. In the present invention, while the sodium content in the carboxyl group-containing nitrile rubber is preferably within the above-mentioned range, the sum of the content of metal other than sodium is preferably 100 ppm by weight or less, more preferably 50 ppm by weight or less, in terms of enhancing the suppression effect on the increase of the viscosity in the case of adding a cross-linking agent (compound Mooney viscosity).

The content of a carboxyl group in the carboxyl group-containing nitrile rubber of the present invention, i.e., the number of moles of a carboxyl group per 100 g of the carboxyl group-containing nitrile rubber is preferably $5\times10^{-4}$ to $5\times10^{-1}$ ephr, more preferably $1\times10^{-3}$ to $1\times10^{-1}$ ephr, particularly preferably $5\times10^{-3}$ to $6\times10^{-2}$ ephr. By setting the content of a carboxyl group the carboxyl group-containing nitrile rubber within the above-mentioned rage, the formability in the case of adding a cross-linking agent and the compression set resistance of the obtained cross-linked rubber can be further enhanced.

The method for producing the carboxyl group-containing nitrile rubber of the present invention is not particularly limited, but it can be produced by copolymerizing the above-mentioned monomers by emulsion polymerization, and if necessary, hydrogenating a carbon-carbon double bond in the obtained copolymer. At the time of the emulsion polymerization, in addition to the emulsifier, a polymerization initiator, and a molecular weight adjuster, polymerization auxiliary materials usually used can be used.

The emulsifier is not particularly limited, but, for example, nonionic emulsifiers such as polyoxyethylene alkyl ethers, polyoxyethylene alkyl phenol ethers, polyoxyethylene alkyl esters, and polyoxyethylene sorbitan alkyl esters; anionic emulsifiers such as salts of fatty acids such as myristic acid, palmitic acid, oleic acid, and linoleic acid, alkylbenzene sulfonic acid salts such as sodium dodecylbenzene sulfonate, higher alcohol sulfuric acid ester salts, and alkyl sulfosuccinic acid salts; and copolymerizable emulsifiers such as sulfo esters of α,β-unsaturated carboxylic acids, sulfate esters of α,β-unsaturated carboxylic acids, sulfoalkylaryl ethers, etc. may be mentioned. The amount of addition of the emulsifier is preferably 0.1 to 10 parts by weight and more preferably 0.5 to 5 parts by weight with respect to 100 parts by weight of the monomer used for the polymerization.

The polymerization initiator is not particularly limited so long as the polymerization initiator is a radical initiator. For example, inorganic peroxides such as potassium persulfate, sodium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butylperoxyisobutyrate; azo compounds such as azobisisobutyronitrile, azobis-2,4-dimethylvaleronitrile, azobiscyclohexanecarbonitrile, and methyl azobisisobutyrate; etc. may be mentioned. These polymerization initiators can be used alone or as two or more types combined. As the polymerization initiator, an inorganic or organic peroxide is preferable. When a peroxide is used as a polymerization initiator, the peroxide can be used in combination with a reducing agent such as sodium bisulfite or ferrous sulfate as a redox-type polymerization initiator. The amount of addition of the polymerization initiator is preferably 0.01 to 2 parts by weight, with respect to 100 parts by weight of the monomers used for the polymerization.

For the medium of emulsion polymerization, usually water is used. The amount of the water is preferably 80 to 500 parts by weight, and more preferably 80 to 300 parts by weight, with respect to 100 parts by weight of the monomers used for the polymerization.

In the emulsion polymerization, it is possible to further use, if necessary, polymerization auxiliary materials such as a stabilizer, a dispersant, a pH adjuster, a deoxidizer, and a particle size adjuster. When these are used, the types and the amounts used thereof are not particularly limited.

Further, in the present invention, the obtained copolymer is subjected to hydrogenation (hydrogen addition reaction). The hydrogenation may be performed on the basis of a known method. An oil layer hydrogenation method in which the latex of the copolymer obtained by emulsion polymerization is coagulated, and then the hydrogenation is pertained in the oil layer; and an aqueous layer hydrogenation method in which the latex of the obtained copolymer is hydrogenated as it is, etc. may be mentioned. Among these, the aqueous layer hydrogenation method is preferable, since the polymer Mooney viscosity and the polymer pH of the obtained carboxyl group-containing nitrile rubber can be suitably controlled. Further, as the aqueous layer hydrogenation method, an aqueous layer direct hydrogenation method in which the hydrogenation is conducted by supplying hydrogen to the reaction system in the presence of a hydrogenation catalyst, and an indirect aqueous layer hydrogenation method in which the hydrogenation is conducted by reduction in the presence of an oxidizing agent, a reducing agent and an activating agent may be mentioned. Of these two methods, the aqueous layer direct hydrogenation method is preferable.

In the aqueous layer direct hydrogenation method, the concentration of the copolymer in the aqueous layer (concentration in latex state) is preferably 40 wt % or less, in order to prevent the aggregation. The hydrogenation catalyst is not particularly limited so long as the catalyst is a compound being hardly decomposed by water. As specific examples, among palladium catalysts, palladium metal; palladium oxide; palladium hydroxide; palladium salts of carboxylic acids such as formic acid, acetic acid, propionic acid, lauric acid, succinic acid, oleic acid, and phthalic acid; palladium chlorides such as palladium chloride, dichloro(cyclooctadiene)palladium, dichloro(norbornadiene)palladium, and ammonium hexachloropalladate (IV); iodides such as palladium iodide; palladium sulfate dihydrate, etc. may be mentioned. Among these, palladium metal, palladium salts of carboxylic acids, palladium chloride, dichloro(norbornadiene)palladium, and ammonium hexachloropalladate (IV) are particularly preferable. The amount of use of the hydrogenation catalyst may be appropriately set; however, the amount of use of the hydrogenation catalyst is preferably 5 to 6000 ppm by weight and more preferably 10 to 4000 ppm by weight with respect to the copolymer obtained by polymerization.

In the aqueous layer direct hydrogenation method, after the completion of the hydrogenation reaction, the hydrogenation catalyst in the latex is removed. As the method for removing the hydrogenation catalyst, for example, it is possible to adopt a method in which an adsorbent such as activated carbon or an ion-exchange resin is added to the latex, the hydrogenation catalyst is adsorbed to the adsorbent under stirring, and then the latex is subjected to a filtration or centrifugation. Alternatively, it is possible to employ a method in which the hydrogenation catalyst is converted into a complex by adding an oxidizing agent or a reducing agent and complexing agent, then the latex is filtered or centrifuged. It is also possible not to remove the hydrogenation catalyst so as remain in the latex.

Further, in the present invention, a coagulant is added to the thus obtained latex after the hydrogenation reaction to coagulate the latex, and thus, a water-containing crumb of the carboxyl group-containing nitrile rubber is obtained. In the present invention, in terms of controlling the polymer Mooney viscosity and the polymer pH of the obtained carboxyl group-containing nitrile rubber within the above-mentioned ranges, the pH of the latex when coagulation is conducted (the pH of the latex in coagulating) is preferably controlled to be 5.5 or less, more preferably controlled to be in the range of 5 to 2, still more preferably controlled to be in the range of 4.5 to 2. The method of controlling the pH of the latex includes, but not particularly limited to, a method in which an inorganic acid such as sulfuric acid is added to the latex, and the like.

Further, in terms of controlling the polymer Mooney viscosity and the polymer pH within the above-mentioned ranges, the coagulant used for coagulation is not particularly limited but preferably a salt of monovalent cation, more preferably sodium salts such as sodium chloride, sodium nitrate, and sodium sulfate, particularly preferably sodium chloride. The coagulant in the form of an aqueous solution may be added to the latex, or the coagulant may be added as it is without being formed into an aqueous solution. When sodium chloride is added in the form of an aqueous solution, the pH of the aqueous solution may be lowered and then the solution may be added. The method of controlling the pH of the aqueous solution includes, but not particularly limited to, a method in which an inorganic acid such as sulfuric acid is added to the aqueous solution.

Further, the temperature for coagulation (the temperature of the latex in coagulating) is not particularly limited but preferably 80 to 10° C., more preferably 70 to 20° C., in terms of production efficiency.

Further, the water-containing crumb of the carboxyl group-containing nitrile rubber obtained by coagulation is washed by water, then dehydrated and dried and subjected to other operations, and thus, the carboxyl group-containing nitrile rubber can be obtained. The methods of water-washing, dehydrating and drying of the crumb may be similar to the methods of water-washing, dehydrating and drying in the common production a rubber. In the methods of water-washing and dehydrating, the crumb obtained by coagulation may be separated from water using a mesh-patterned filter, centrifuge, etc., then water-washed, and dehydrated by a squeezer, etc. Then, the carboxyl group-containing nitrile rubber of the present invention can be obtained by drying the crumb until the desired water content is obtained using a band dryer, ventilation vertical dryer, twin-screw extruder, etc. which are commonly used for production of rubbers.

Specifically, in the case of controlling the pH of the latex to be preferably 5.5 or less when coagulation is conducted (the pH of the latex in coagulating) and conducting the coagulation using a sodium salt as a coagulant, the content of residual sodium in the obtained carboxyl group-containing nitrile rubber can be suppressed to a low level, even if the number of water-washing operations after coagulation is reduced (for example, even if the number of water-washing operations after coagulation is one). Thus, according to such a method, the carboxyl group-containing nitrile rubber having a polymer Mooney viscosity of 60 or less and a polymer pH of 7 or less can be suitably obtained at a high production efficiency.

In the above description, although the method is illustrated in which the pH of the latex is controlled when coagulation is conducted and sodium salt is used as a coagulant as the method of controlling the polymer Mooney viscosity to be 60 or less and the polymer pH to be 7 or less for the carboxyl group-containing nitrile rubber, such a method is one example of methods of controlling the polymer Mooney viscosity to be 60 or less and the polymer pH to be 7 or less, and it is not particularly limited to such a method.

Cross-Linkable Nitrile Rubber Composition

The cross-linkable nitrile rubber composition of the present invention is obtained by adding a cross-linking agent to the above-mentioned carboxyl group-containing nitrile rubber.

The cross-linking agent is not particularly limited, but a polyamine-based cross-linking agent can be suitably used in the present invention.

The polyamine-based cross-linking agent is not particularly limited so long as the polyamine-based cross-linking agent is a compound having two or more amino groups or a compound becoming a form having two or more amino groups at the time of cross-linking, but however, the polyamine-based cross-linking agent is preferably a compound comprised of an aliphatic hydrocarbon or an aromatic hydrocarbon in which a plurality of hydrogen atoms are substituted with amino groups or hydrazide structures (structures each represented by —$CONHNH_2$, where CO represents a carbonyl group) and a compound becoming the form of the aforementioned compound at the time of cross-linking.

As specific examples of the polyamine-based cross-linking agent, aliphatic polyvalent amines such as hexamethylenediamine, hexamethylenediamine carbamate, N,N-dicinnamylidene-1,6-hexanediamine, tetramethylenepentamine, and hexamethylenediamine cinnamaldehyde adduct; aromatic polyvalent amines such as 4,4-methylenedianiline, m-phenylenediamine, 4,4-diaminodiphenyl ether, 3,4-diaminodiphenyl ether, 4,4-(m-phenylenediisopropylidene)dianiline, 4,4-(p-phenylenediisopropylidene)dianiline, 2,2-bis[4-(4-aminophenoxy)phenyl]propane, 4,4-diaminobenzanilide, 4,4-bis(4-aminophenoxy)biphenyl, m-xylylenediamine, p-xylylenediamine, and 1,3,5-benzenetriamine; and polyvalent hydrazides such as isophthalic acid dihydrazide, terephthalic acid dihydrazide, phthalic acid dihydrazide, 2,6-naphthalene dicarboxylic acid dihydrazide, naphthalenic acid dihydrazide, oxalic acid dihydrazide, malonic acid dihydrazide, succinic acid dihydrazide, glutamic acid dihydrazide, adipic acid dihydrazide, pimelic acid dihydrazide, suberic acid dihydrazide, azelaic acid dihydrazide, sebacic acid dihydrazide, brassylic acid dihydrazide, dodecanedioic acid dihydrazide, acetone dicarboxylic acid dihydrazide, fumaric acid dihydrazide, maleic acid dihydrazide, itaconic acid dihydrazide, trimellitic acid dihydrazide, 1,3,5-benzene tricarboxylic acid dihydrazide, aconitic acid dihydrazide, and pyromellitic acid dihydrazide; etc. may be mentioned. Among these, from the viewpoint of being capable of making the effects of the present invention more remarkable, aliphatic polyvalent amines and the aromatic polyvalent amines are preferable, hexamethylenediamine carbamate and 2,2-bis[4-(4-aminophenoxy)phenyl]propane are more preferable, and hexamethylenediamine carbamate is particularly preferable.

The content of the cross-linking agent in the cross-linkable nitrile rubber composition of the present invention is not particularly limited, but is preferably 0.1 to 20 parts by weight, more preferably 0.2 to 15 parts by weight, and still more preferably 0.5 to 10 parts by weight, with respect to 100 parts by weight of the carboxyl group-containing nitrile rubber. By setting the content of the cross-linking agent within the above-mentioned range, it is possible to make the mechanical properties of the obtained cross-linked rubber better.

When a polyamine-based cross-linking agent is used as the cross-linking agent, the cross-linkable nitrile rubber composition preferably further contains a basic cross-linking accelerator, from the viewpoint of being capable of more enhancing the mechanical properties of the obtained cross-linked rubber.

As specific examples of the basic cross-linking accelerator, a compound represented by the following general formula (1), a basic cross-linking accelerator having a cyclic amidine structure, a guanidine-based basic cross-linking accelerator, an aldehyde amine-based basic cross-linking accelerator, etc. may be mentioned.

$$R^1\text{—}NH\text{—}R^2 \quad (1)$$

(In the general formula (1), $R^1$ and $R^2$ are each independently a substituted or unsubstituted alkyl group having 1 to 12 carbon atoms, or a substituted or unsubstituted cycloalkyl group having 5 to 12 carbon atoms.)

$R^1$ and $R^2$ are each a substituted or unsubstituted alkyl group having 1 to 12 carbon atoms, or a substituted or unsubstituted cycloalkyl group having 5 to 12 carbon atoms, but are each preferably a substituted or unsubstituted cycloalkyl group having 5 to 12 carbon atoms, and particularly preferably a substituted or unsubstituted cycloalkyl group having 5 to 8 carbon atoms.

Further, $R^1$ and $R^2$ each preferably have no substituent.

Note that, as specific examples of the substituent(s) in the case where $R^1$ and $R^2$ each have a substituent(s), a hydroxyl group, an alkoxy group, an alkoxycarbonyl group, an amino group, a halogen atom, etc. may be mentioned.

Further, among the compounds represented by the above general formula (1), from the viewpoint of being capable of more enhancing the processability and scorch stability, a compound represented by the following general formula (2) is more preferable.

$$R^3\text{—}NH\text{—}R^4 \quad (2)$$

(In the general formula (2), $R^3$ and $R^4$ are each independently a substituted or unsubstituted cycloalkyl group having 5 to 8 carbon atoms.)

$R^3$ and $R^4$ are each a substituted or unsubstituted cycloalkyl group having 5 to 8 carbon atoms, but are each preferably a substituted or unsubstituted cycloalkyl group having 5 to 6 carbon atoms, and more preferably a substituted or unsubstituted cycloalkyl group having 6 carbon atoms.

Further, $R^3$ and $R^4$ each preferably have no substituent.

Note that as specific examples of the substituent(s) in the case where $R^3$ and $R^4$ each have a substituent(s), a hydroxyl group, an alkoxy group, an alkoxycarbonyl group, an amino group, a halogen atom, etc. may be mentioned.

As specific examples of the compound represented by the general formula (1), dicycloalkylamines such as dicyclopentylamine, dicyclohexylamine, and dicycloheptylamine; secondary amines each having an alkyl group and a cycloalkyl group bonded to the nitrogen atom such as N-methylcyclopentylamine, N-butylcyclopentylamine, N-heptylcyclopentylamine, N-octylcyclopentylamine, N-ethylcyclohexylamine, N-butylcyclohexylamine, N-heptylcyclohexylamine, and N-octylcyclooctylamine; secondary amines each having a hydroxyl group-containing alkyl group and a cycloalkyl group bonded to the nitrogen atom such as N-hydroxymethylcyclopentylamine and N-hydroxybutylcyclohexylamine; secondary amines each having an alkoxy group-containing alkyl group and a cycloalkyl group bonded to the nitrogen atom such as N-methoxyethylcyclopentylamine and N-ethoxybutylcyclohexylamine; secondary amines each having an alkoxycarbonyl group-containing alkyl group and a cycloalkyl group bonded to the nitrogen atom such as N-methoxycarbonylbutylcyclopentylamine and N-methoxycarbonylheptylcyclohexylamine; secondary amines each having an amino group-containing alkyl group and a cycloalkyl group bonded to the nitrogen atom such as N-aminopropylcyclopentylamine and N-aminoheptylcyclohexylamine; and secondary amines each having a halogen atom-containing cycloalkyl group bonded to the nitrogen atom such as di(2-chlorocyclopentyl)amine and di(3-chlorocyclopentyl)amine; etc. may be mentioned, but from the viewpoint of being capable of more enhancing the processability and the scorch stability, a dicycloalkylamine is preferable, dicyclopentylamine and dicyclohexylamine are more preferable, and dicyclohexylamine is particularly preferable.

As the basic cross-linking accelerator having a cyclic amidine structure, 1,8-diazabicyclo[5.4.0]undecene-7 (hereinafter, sometimes abbreviated as "DBU"), 1,5-diazabicyclo[4.3.0]nonene-5 (hereinafter, sometimes abbreviated as "DBN"), 1-methylimidazole, 1-ethylimidazole, 1-phenylimidazole, 1-benzylimidazole, 1,2-dimethylimidazole, 1-ethyl-2-methylimidazole, 1-methoxyethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxyimidazole, 1-methyl-2-ethoxyimidazole, 1-methyl-4-methoxyimidazole, 1-methyl-2-methoxyimidazole, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl)imidazole, 1-methylbenzimidazole, 1-methyl-2-benzylbenzimidazole, 1-methyl-5-nitrobenzimidazole, 1-methylimidazoline, 1,2-dimethylimidazoline, 1,2,4-trimethylimidazoline, 1,4-dimethyl-2-ethylimidazoline, 1-methyl-phenylimidazoline, 1-methyl-2-benzylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2-ethoxymethylimidazoline, 1-ethoxymethyl-2-methylimidazoline, etc. may be mentioned. Among these basic cross-linking accelerators each having a cyclic amidine structure, 1,8-diazabicyclo[5.4.0]undecene-7 and 1,5-diazabicyclo[4.3.0]nonene-5 are preferable, and 1,8-diazabicyclo[5.4.0]undecene-7 is more preferable.

As the guanidine-based basic cross-linking accelerator, tetramethylguanidine, tetraethylguanidine, diphenylguanidine, 1,3-di-o-tolylguanidine, o-tolylbiguanide, etc. may be mentioned.

As the aldehyde amine-based basic cross-linking accelerator, n-butylaldehyde aniline, acetaldehyde ammonia, etc. may be mentioned.

Among these basic cross-linking accelerators, a compound represented by the general formula (1), a guanidine-based basic cross-linking accelerator, and a basic cross-linking accelerator having a cyclic amidine structure are preferable, and a compound represented by the general formula (1) and a basic cross-linking accelerator having a cyclic amidine structure are more preferable.

Note that the compound represented by the general formula (1) may be comprised of alcohols such as an alkylene glycol and an alkyl alcohol having 5 to 20 carbon atoms mixed together, and may further contain an inorganic acid and/or an organic acid. Further, as for the compound represented by the general formula (1), the compound represented by the general formula (1) may form a salt(s) with the inorganic acid and/or the organic acid, and further may form a complex with an alkylene glycol. Further, the basic cross-linking accelerator having the above cyclic amidine structure may form a salt with a carboxylic acid or an alkyl phosphoric acid, etc.

In the case where the basic cross-linking accelerator is mixed, the amount of the basic cross-linking accelerator in the cross-linkable nitrile rubber composition of the present invention is preferably 0.1 to 20 parts by weight, more preferably 0.2 to 15 parts by weight, and still more preferably 0.5 to 10 parts by weight, with respect to 100 parts by weight of the carboxyl group-containing nitrile rubber.

Other Compounding Agents

Further, the cross-linkable nitrile rubber composition of the present invention may include, in addition to the above components, compounding agents usually used in the field of rubber such as a filler, a metal oxide such as zinc oxide or magnesium oxide, an α,β-ethylenically unsaturated carboxylic acid metal salt such as zinc methacrylate or zinc acrylate, a co-cross-linking agent, a cross-linking aid, a cross-linking retarder, an antiaging agent, an antioxidant, a light stabilizer, a scorch retarder such as a primary amine, an activating agent such as diethylene glycol, a silane coupling agent, a plasticizer, a processing aid, a slip agent, an adhesive, a lubricant, a flame retardant, an antifungal agent, an acid acceptor, an antistatic agent, a pigment, and a foaming agent. The amounts of these compounding agents are not particularly limited and the compounding agents can be compounded in the amounts according to the compounding purposes so long as the compounding amounts are within ranges not impairing the object and the effects of the present invention.

The filler is not particularly limited and can be any filler so long as the filler is usually used in the field of rubber; either of an organic filler and an inorganic filler can be used, but an inorganic filler is preferable from the viewpoint of the higher compounding effect thereof.

The inorganic filler may be an inorganic filler usually used for rubber compounding; as the inorganic filler, for example, carbon black, silica, clay, alumina, aluminum hydroxide, magnesium oxide, magnesium hydroxide, calcium oxide, calcium hydroxide, magnesium aluminum oxide, titanium oxide, kaolin, pyrophyllite, bentonite, talc, attapulgite, calcium magnesium silicate, aluminum silicate, magnesium silicate, calcium silicate, crystalline aluminosilicate, etc. may be mentioned. Among these, carbon black, silica, and clay are preferably used. The inorganic fillers may be used as single types alone or as a plurality of types combined.

The carbon black may be a carbon black usually used for rubber compounding; as the carbon black, for example, furnace black, acetylene black, thermal black, channel black, graphite, etc. may be mentioned.

As the silica, natural silicas such as quartz powder and silica stone powder, synthetic silicas such as silicic anhydride (such as silica gel and Aerosil), and hydrous silicic acid, etc. may be mentioned; among these, the synthetic silicas are preferable.

The clay may be any natural mineral mainly composed of hydrous aluminum silicate; as such a clay, without being particularly limited to, montmorillonite, pyrophyllite, kaolinite, halloysite, sericite, etc. may be mentioned.

Note that as the inorganic filler, there may be used an inorganic filler subjected to a coupling treatment with a silane coupling agent, a titanium coupling agent or the like, or subjected to a surface modification treatment with a higher fatty acid or a metal salt thereof, a higher fatty acid derivative such as an ester or an amide, a surfactant or the like.

The silane coupling agent is not particularly limited, but as specific examples thereof, sulfur-containing silane coupling agents such as γ-mercaptopropyltrimethoxysilane, γ-mercaptomethyltrimethoxysilane, γ-mercaptomethyltriethoxysilane, γ-mercaptohexamethyldisilazane, bis(3-triethoxysilylpropyl)tetrasulfane, and bis(3-triethoxysilylpropyl)disulfane; epoxy group-containing silane coupling agents such as γ-glycidoxypropyltrimethoxy silane, γ-glycidoxypropylmethyldimethoxysilane, β-(3,4-epoxycyclohexyl)ethyltrimethoxysilane, and γ-glycidoxypropylmethyldiethoxysilane; amino group-containing silane coupling agents such as N-(β-aminoethyl)-γ-aminopropyltrimethoxysilane, γ-aminopropyltrimethoxysilane, γ-aminopropyltriethoxysilane, N-2-(aminoethyl)-3-aminopropyltrimethoxysilane, N-2-(aminoethyl)-3-aminopropyltriethoxysilane, 3-triethoxysilyl-N-(1,3-dimethyl-butylidene)propylamine, and N-phenyl-3-aminopropyltrimethoxysilane; (meth)acryloxy group-containing silane coupling agents such as γ-methacryloxypropyltrimethoxysilane, γmethacryloxypropyltris(β-methoxyethoxy)silane, γ-methacryloxypropylmethyldimethoxysilane, γ-methacryloxypropylmethyldiethoxysilane, γ-methacryloxypropyltriethoxysilane, and γ-acryloxypropyltrimethoxysilane; vinyl group-containing silane coupling agents such as vinyltrimethoxysilane, vinyltriethoxysilane, vinyltris(β-methoxyethoxy)silane, vinyltrichlorosilane, and vinyltriacetoxysilane; chloropropyl group-containing silane coupling agents such as 3-chloropropyltrimethoxysilane; isocyanate group-containing silane coupling agents such as 3-isocyanatopropyltriethoxysilane; styryl group-containing silane coupling agents such as p-styryltrimethoxysilane; ureido group-containing silane coupling agents such as 3-ureidopropyltriethoxysilane; allyl group-containing silane coupling agents such as diallyldimethyl silane; alkoxy group-containing silane coupling agent such as tetraethoxysilane; phenyl group-containing silane coupling agents such as diphenyldimethoxysilane; fluoro group-containing silane coupling agent such as trifluoropropyltrimethoxysilane; alkyl group-containing silane coupling agents such as isobutyltrimethoxysilane and cyclohexylmethyldimethoxysilane; aluminum-based coupling agents such as acetoalkoxyaluminum diisopropylate; titanate-based coupling agents such as isopropyltriisostearoyl titanate, isopropyltris(dioctylpyrophosophate) titanate, isopropyltri(N-aminoethyl-aminoethyl) titanate, tetraoctylbis(ditridecylphosphite) titanate, tetra(2,2-diallyloxymethyl-1-butyl)bis(ditridecyl)phosphite titanate, bis(dioctylpyrophosphate)oxyacetate titanate, bis(dioctylpyrophosphate)ethylene titanate, tetraisopropylbis(dioctylphosphite) titanate, and isopropyltriisostearoyl titanate; etc. may be mentioned. These may be used as single types alone or as a plurality of types combined.

The co-cross-linking agent is not particularly limited, but low-molecular or high-molecular compounds having more than one radical-reactive unsaturated group in the molecule are preferable, for example, multifunctional vinyl compounds such as divinylbenzene and divinylnaphthalene; isocyanurates such as triallyl isocyanurate, trimethallyl isocyanurate; cyanurates such as triallyl cyanurate; maleimides such as N-N'-m-phenylenedimaleimide; allyl esters of polyvalent acids such as diallyl phthalate, diallyl isophthalate, diallyl maleate, diallyl fumarate, diallyl sebacate, triallyl phosphate; diethylene glycol bisallyl carbonate; allyl ethers such as ethylene glycol diallyl ether, triallyl ether of trimethylolpropane, and partial allyl ether of pentaerythritol; allyl-modified resins such as allylated novolac and allylated resol resin; trifunctional to pentafunctional methacrylate compounds and acrylate compounds such as trimethylolpropane trimethacrylate and trimethylolpropane triacrylate; may be mentioned. These may be used as single types alone or as a plurality of types combined.

The plasticizer is not particularly limited, but possible to use a trimellitic acid-based plasticizer, a pyromellitic acid-based plasticizer, an ether ester-based plasticizer, a polyester-based plasticizer, a phthalic acid-based plasticizer, an adipic acid ester-based plasticizer, a phosphoric acid ester-based plasticizer, a sebacic acid ester-based plasticizer, an alkylsulfonic acid ester compound plasticizer, and an epoxidized vegetable oil-based plasticizer can be used. As specific examples, tri-2-ethylhexyl trimellitate, trimellitic acid isononyl ester, trimellitic acid mixed linear alkyl ester, dipentaerythritol ester, pyromellitic acid 2-ethylhexyl ester, polyether ester (molecular weight: approximately 300 to 5000), adipic acid bis[2-(2-butoxyethoxy)ethyl], dioctyl adipate, adipic acid-based polyester (molecular weight: approximately 300 to 5000), dioctyl phthalate, diisononyl phthalate, dibutyl phthalate, tricresyl phosphate, dibutyl sebacate, alkylsulfonic acid phenyl ester, epoxidized soybean oil, diheptanoate, di-2-ethyl hexanoate, didecanoate, etc. may be mentioned. These may be used as single types or a plurality of types combined.

Furthermore, the cross-linkable nitrile rubber composition of the present invention may contain rubber other than the carboxyl group-containing nitrile rubber of the present invention in a range where the effects of the present invention are not obstructed. As such rubber other than the carboxyl group-containing nitrile rubber of the present invention, acrylic rubber, ethylene-acrylic acid copolymer rubber, fluororubber, styrene-butadiene copolymer rubber, polybutadiene rubber, ethylene-propylene copolymer rubber, ethylene-propylene-diene ternary copolymer rubber, epichlorohydrin rubber, urethane rubber, chloroprene rubber, silicone rubber, fluorosilicone rubber, chlorosulfonated polyethylene rubber, natural rubber, polyisoprene rubber, etc. may be mentioned. When mixing in rubber other than the carboxyl group-containing nitrile rubber of the present invention, the amount is preferably 30 parts by weight or less, more preferably 20 parts by weight or less, still more preferably 10 parts by weight or less with respect to 100 parts by weight of the carboxyl group-containing nitrile rubber of the present invention.

The cross-linkable nitrile rubber composition of the present invention is prepared by mixing the above-mentioned ingredients preferably in a nonaqueous system. The method for preparing the cross-linkable nitrile rubber composition of the present invention is not limited, but the cross-linkable nitrile rubber composition of the present invention can be usually prepared as follows: the ingredients other than the cross-linking agent and the ingredients unstable against heat (such as a cross-linking aid) are subjected to a primary kneading with a mixing machine such as a Banbury mixer, an internal mixer and a kneader; then the kneaded mixture is transferred to a roll or the like, and the cross-linking agent and the ingredients unstable against heat are added to the kneaded mixture, and then the resulting mixture is subjected to a secondary kneading to prepare the cross-linkable nitrile rubber composition.

Cross-Linked Rubber

The cross-linked rubber of the present invention is obtained by cross-linking the above cross-linkable nitrile rubber composition of the present invention.

The cross-linked rubber of the present invention can be produced as follows: the cross-linkable nitrile rubber composition of the present invention is used, the composition is formed by using a forming machine corresponding to the desired shape, such as an extruder, an injection molding machine, a compressor, or a roll, the cross-linking reaction is performed by heating the formed product, and thus the shape of the formed product is fixed to produce the cross-linked rubber. In this case, the cross-linking may be performed after preliminarily performing the forming, or alternatively, the forming and the cross-linking may also be performed simultaneously. The forming temperature is usually 10 to 200° C., and preferably 25 to 120° C. The cross-linking temperature is usually 100 to 200° C. and preferably 130 to 190° C., and the cross-linking time is usually 1 minute to 24 hours and preferably 2 minutes to 1 hour.

Further, depending on the shape, size, etc. of the cross-linked product, sometimes, even if the surface is cross-linked, the inside part is not sufficiently cross-linked, so it is possible to further heat the rubber for secondary cross-linking.

As the heating method, a general method which is used for cross-linking rubber such as press heating, steam heating, oven heating, and hot air heating may be suitably selected.

The thus obtained cross-linked rubber of the present invention is obtained by using the above-mentioned cross-linkable nitrile rubber composition of the present invention, and is excellent in the original state physical properties, compression set resistance and water resistance.

Therefore, the cross-linked rubber of the present invention, taking advantage of such a characteristic, can be used for various seal members such as O-rings, packings, diaphragms, oil seals, shaft seals, bearing seals, well head seals, shock absorber seals, air compressor seals, seals for sealing in Freon or fluorohydrocarbons or carbon dioxide which is used for compressors for cooling devices for air-conditioners or refrigerating machines of air-conditioning systems, seals for sealing in supercritical carbon dioxide or subcritical carbon dioxide which is used for the washing media in precision washing, seals for roller devices (roller bearings, automotive hub units, automotive water pumps, linear guide devices and ball screws, etc.), valves and valve seats, BOP (blow out preventer), and bladders; various types of gaskets such as intake manifold gaskets which are attached at connecting parts of intake manifolds and cylinder heads, cylinder head gaskets which are attached at connecting parts of cylinder blocks and cylinder heads, rocker cover gaskets which are attached at connecting parts of rocker covers and cylinder heads, oil pan gaskets which are attached at connecting parts of oil pans and cylinder blocks or transmission cases, fuel cell separator gaskets which are attached between pairs of housings straddling unit cells provided with positive electrodes, electrolyte plates, and negative electrodes, and top cover gaskets for hard disk drives; various types of rolls such as printing rolls, ironmaking rolls, papermaking rolls, industrial rolls, and office equipment rolls; various types of belts such as flat belts (film core flat belts, cord flat belts, laminated flat belts, single type flat belts, etc.), V-belts (wrapped V-belts, low edge V-belts, etc.), V-ribbed belts (single V-ribbed belts, double V-ribbed belts, wrapped V-ribbed belt, rubber-backed V-ribbed belts, top cog V-ribbed belts, etc.), CVT use belts, timing belts, toothed belts, and conveyor belts; various types of hoses such as fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, and flow lines; and various types of boots such as CVJ boots, propeller shaft boots, constant velocity joint boots, and rack and pinion boots; attenuating member rubber parts such as cushion materials, dynamic dampers, rubber couplings, air springs, shock absorbers, and clutch facing materials; dust covers, automotive interior members, friction materials, tires, covered cables, shoe soles, electromagnetic wave shields, binders for flexible printed circuit boards or other binders, fuel cell separators and also other broad applications in the electronics field.

EXAMPLES

Hereinafter, the present invention will be described specifically by way of Examples and Comparative Examples. In what follows, unless otherwise specified, "parts" are based on weight. Note that the tests and the evaluations were carried out as follows.

Composition of Carboxyl Group-Containing Nitrile Rubber

The contents of the respective monomer units constituting the carboxyl group-containing nitrile rubber were measured by the following methods.

Specifically, the content of the mono-n-butyl maleate unit was calculated as follows: To 0.2 g of a 2-mm square piece of a carboxyl group-containing nitrile rubber, 100 mL of 2-butanone was added. The mixture was stirred for 16 hours, and then 20 mL of ethanol and 10 mL of water were added to the mixture. While stirring, a titration was performed at room temperature by using a 0.02 N hydrous ethanol solution of potassium hydroxide, and thymolphthalein as an indicator, and thus the number of moles of the carboxyl group with respect to 100 g of the carboxyl group-containing nitrile rubber was determined, and converted into the content of the mono-n-butyl maleate unit.

The content of the 1,3-butadiene unit (including the hydrogenated fraction) was calculated by measuring the iodine value of the carboxyl group-containing nitrile rubber before the hydrogenation reaction by the below-mentioned method.

The content of the acrylonitrile unit was calculated by measuring the nitrogen content in the carboxyl group-containing nitrile rubber after hydrogenation by the Kjeldahl method in accordance with JIS K6384.

The content of the n-butyl acrylate unit and the content of the methoxyethyl acrylate unit were calculated as the balances of the monomer units.

Iodine Value

The iodine value of the carboxyl group-containing nitrile rubber was measured in accordance with JIS K 6235.

Mooney Viscosity (Polymer Mooney Viscosity, Compound Mooney Viscosity)

The Mooney viscosity (polymer Mooney viscosity) of the carboxyl group-containing nitrile rubber and the Mooney viscosity (compound Mooney viscosity) of the cross-linkable nitrile rubber were measured in accordance with JIS K 6300 (units: [ML1+4, 100° C.]).

Polymer pH

The polymer pH of the carboxyl group-containing nitrile rubber was measured by the following procedure. Firstly, the carboxyl group-containing nitrile rubber was foiled into a sheet using a roll, the carboxyl group-containing nitrile rubber in the form of a sheet was cut into small pieces with scissors, then 6 g (±0.05 g) of the cut carboxyl group-containing nitrile rubber was weighed out. Then, the weighed 6 g of the carboxyl group-containing nitrile rubber was added to an Erlenmeyer flask containing 100 g of tetrahydrofuran, and dissolved in tetrahydrofuran by stirring. Then, 2.0 ml of distilled water (±0.1 ml) was sucked by a syringe, and added dropwise to the Erlenmeyer flask while stirring the solution. After adding distilled water, stirring was continued until the aggregate formed by dropwise addition of distilled water was dissolved completely. Then, after confirming complete dissolution of the aggregate, a pH electrode was inserted into the Erlenmeyer flask and pH measurement was conducted, and the polymer pH was determined as the pH value one minute after the start of the measurement.

Content of Sodium

Sulfuric acid and nitric acid were added to the carboxyl group-containing nitrile rubber, and the mixture was heated and subjected to wet decomposition, then diluted suitably, and thus the content of sodium in the carboxyl group-containing nitrile rubber was measured using ICP-AES (SPS-5000: made by SEIKO Instruments Inc.) in accordance with the internal standard calibration method.

Original State Physical Properties (Tensile Strength, Elongation, Hardness)

The cross-linkable nitrile rubber composition was placed in a mold of 15 cm in length, 15 cm in width and 0.2 cm in depth, and was press-formed at 170° C. for 20 minutes while being pressurized at a press pressure of 10 MPa. Thus, a sheet-shaped primary cross-linked product was obtained. Then, the obtained primary cross-linked product was transferred to a gear oven and subjected to a secondary cross-linking at 170° C. for 4 hours. The obtained sheet-like cross-linked rubber was punched with a No. 3 type dumbbell to prepare a test piece. By using the obtained test piece, the tensile strength and the elongation of the cross-linked rubber were measured in accordance with JIS K6251, and the hardness of the cross-linked rubber was measured using a durometer hardness testing machine type A in accordance with JIS K6253.

Compression Set (O-Ring Compression Set)

By using a mold of 30 mm in inner diameter and 3 mm in ring diameter, a cross-linkable nitrile rubber composition was cross-linked and molded at a temperature of 170° C. and a press pressure of 10 MPa for 20 minutes, and then subjected to a secondary cross-linking at a temperature of 170° C. for 4 hours to give an O-ring test piece. By using this test piece, the O-ring compression set was measured under the conditions of maintaining a state of being compressed by 25% at 150° C. for 168 hours, in accordance with JIS K6262.

Water Resistance

The cross-linkable nitrile rubber composition was placed in a mold of 15 cm in length, 15 cm in width and 0.2 cm in depth, and was press-formed at 170° C. for 20 minutes while being pressurized at a press pressure of 10 MPa. Thus, a sheet-shaped primary cross-linked product was obtained. Subsequently, the obtained primary cross-linked product was transferred to a gear oven to be subjected to a secondary cross-linking at 170° C. for 4 hours, and thus a sheet-shaped cross-linked rubber was obtained. Then, a test piece of 3 cm×2 cm×0.2 cm was cut off from the obtained sheet-shaped cross-linked rubber, and the immersion test was conducted in which the obtained test piece was immersed in distilled water adjusted to a temperature of 80° C. for 70 hours, in accordance with JIS K6258, and thus the volume change rate of the test piece before and after immersion was measured in accordance with the formula below. If the volume change rate is lower, it means that a swelling by water is suppressed and that the water resistance is excellent.

Volume Change Rate Before And After Immersion In Water (%)=(Volume of a test piece after immersion−Volume of a test piece before immersion)÷Volume of a test piece before immersion×100

Example 1

Production of Carboxyl Group-Containing Nitrile Rubber (A)

In a metal bottle, 180 parts of ion exchanged water, 25 parts of an aqueous solution of sodium dodecylbenzenesulfonate having a concentration of 10 wt %, 35 parts of acrylonitrile, 6 parts of mono-n-butyl maleate, and 0.75 parts of t-dodecyl mercaptan (molecular weight adjuster) were placed in the mentioned order, the gas inside the metal bottle was replaced with nitrogen three times, and then 59 parts of 1,3-butadiene was placed in the metal bottle. The metal bottle was held at 5° C., 0.1 part of cumene hydroperoxide (polymerization initiator) was placed in the metal bottle, and the polymerization reaction was performed for 16 hours while the metal bottle was being rotated. Then, 0.1 part of an aqueous solution of hydroquinone (polymerization terminator) having a concentration of 10 wt % was added to terminate the polymerization reaction; successively, the residual monomers were removed by using a rotary evaporator at a water temperature of 60° C., to obtain a latex (solid content concentration: approximately 30 wt %) of a copolymer rubber.

Then, in an autoclave, the latex obtained as described above and a palladium catalyst (a solution prepared by mixing a 1 wt % palladium acetate acetone solution and an equal weight of ion exchanged water) were added in such a way that the concentration of palladium was 2500 ppm by weight with respect to the dry weight of the rubber contained in the latex obtained as described above; then, a hydrogenation reaction was performed at a hydrogen pressure of 3 MPa and a temperature of 60° C. for 4 hours to obtain a latex of a hydrogenated copolymer rubber (a) of pH 6.8.

Then, to the latex of the hydrogenated copolymer rubber (a), a 2 wt % aqueous solution of sulfuric acid was added to adjust the pH of the latex of the hydrogenated copolymer rubber (a) to 4, then the temperature of the latex was adjusted to 60° C. To the latex which had been subjected to adjustment of pH and temperature, a 5 wt % aqueous solution of sodium chloride adjusted to pH 2 by a 2 wt % aqueous solution of sulfuric acid was added as a coagulant in a such a way that the content of sodium chloride was 80 wt % with respect to the copolymer rubber, to obtain a water-containing crumb. Then the obtained water-containing crumb was water-washed once, separated by filtration, and dried in a vacuum at 60° C. for 12 hours, and thus the carboxyl group-containing nitrile rubber (A) was obtained.

The obtained carboxyl group-containing nitrile rubber (A) had an iodine value of 8, a polymer Mooney viscosity (ML1+4, 100° C.) of 45, and a polymer pH of 6.0, and the content of sodium of the obtained carboxyl group-containing nitrile rubber (A) was 2120 ppm by weight. The obtained carboxyl group-containing nitrile rubber (A) consisted of 36 wt % of the acrylonitrile unit, 59 wt % of the butadiene unit (including the hydrogenated fraction), and 5 wt % of the mono-n-butyl maleate unit.

Preparation of Cross-Linkable Nitrile Rubber Composition

By using a Banbury mixer, the following ingredients were added to and mixed with at 50° C. for 5 minutes with 100 parts of the carboxyl group-containing nitrile rubber (A) obtained above: 40 parts of an FEF carbon black (trade name "Seast SO", made by Tokai Carbon Co., Ltd.), 5 parts of tri-2-ethylhexyl trimellitate (trade name "Adekacizer C-8", made by ADEKA Corporation, plasticizer), 1.5 parts of 4,4'-di-(α,α-,dimethylbenzyl)diphenylamine (trade name "Nocrac CD", made by Ouchi Shinko Chemical Industrial Co., Ltd., antiaging agent), 1 part of stearic acid, 1 part of polyoxyethylene alkyl ether phosphoric acid ester (trade name "Phosphanol RL210", made by Toho Chemical Industry Co., Ltd., processing aid). Next, the obtained mixture was transferred to a roll at 50° C., 2.4 parts of hexamethylenediamine carbamate (trade name "Diak#1", made by Du Pont Dow Elastomer Corporation, polyamine-based cross-linking agent belonging to aliphatic polyvalent amines), and 4 parts of 1,8-diazabicyclo[5.4.0]-undecene-7 (DBU) (trade name "RHENOGRAN XLA-60 (GE2014)", made by Rhein Chemie Corporation; a product of 60% of DBU (including a fraction being zinc dialkyldiphosphate salt), a basic cross-linking accelerator) were added to the mixture, and the mixture was kneaded to obtain a cross-linkable nitrile rubber composition.

By using the obtained cross-linkable nitrile rubber composition, the measurement of the compound Mooney viscosity was performed by using the above-mentioned methods, and in addition, the obtained cross-linkable nitrile rubber composition was made into a crosslinked rubber article and the measurements of the original state physical properties (tensile strength, elongation at break, hardness), the compression set (O-ring compression set), and the water resistance were performed. The results thus obtained are shown in Table 1.

Example 2

Production of Carboxyl Group-Containing Nitrile Rubber (B)

A latex of a copolymer rubber was obtained by conducting polymerization in the same manner as in Example 1 except that the amount of acrylonitrile used was altered to 21 parts, the amount of 1,3-butadiene used was altered to 42 parts, and additional 31 parts of n-butyl acrylate was added. The latex of the hydrogenated copolymer rubber (b) of pH 6.6 was obtained by conducting a hydrogenation reaction in the same manner as in Example 1.

Then, to the latex of the hydrogenated copolymer rubber (b), a 2 wt % aqueous solution of sulfuric acid was added to adjust the pH of the latex of the hydrogenated copolymer rubber (b) to 4.5, then the temperature of the latex was adjusted to 40° C. To the latex which had been subjected to adjustment of pH and temperature, a 5 wt % aqueous solution of sodium chloride was added as a coagulant in such a way that the content of sodium chloride was 50 wt % with respect to the copolymer rubber, to obtain a water-containing crumb. Then the obtained water-containing crumb was water-washed once, separated by filtration, and vacuum dried at 60° C. for 12 hours, and thus the carboxyl group-containing nitrile rubber (B) was obtained.

The iodine value, polymer Mooney viscosity (ML1+4, 100° C.), polymer pH, content of sodium, and monomer composition of the obtained carboxyl group-containing nitrile rubber (B) are shown in Table 1.

Preparation of Cross-Linkable Nitrile Rubber Composition

A cross-linkable nitrile rubber composition was prepared in the same manner as in Example 1 except that 100 parts of the carboxyl group-containing nitrile rubber (B) obtained above was used in place of 100 parts of the carboxyl group-containing nitrile rubber (A), and the evaluations were performed in the same manner as in Example 1. The results thus obtained are shown in Table 1.

Example 3

Production of Carboxyl Group-Containing Nitrile Rubber (C)

A latex of a copolymer rubber was obtained by conducting polymerization in the same manner as in Example 1 except that the amount of acrylonitrile used was altered to 43 parts, the amount of 1,3-butadiene used was altered to 51 parts, respectively. The latex of the hydrogenated copolymer rubber (c) of pH 6.5 was obtained by conducting a hydrogenation reaction in the same manner as in Example 1.

Then, to the latex of the hydrogenated copolymer rubber (c), a 2 wt % aqueous solution of sulfuric acid was added to adjust the pH of the latex of the hydrogenated copolymer rubber (c) to 4, then the temperature of the latex was adjusted to 50° C. To the latex which had been subjected to adjustment of pH and temperature, a 5 wt % aqueous solution of sodium chloride adjusted to pH 2 by a 2 wt % aqueous solution of sulfuric acid was added as a coagulant in such a way that the content of sodium chloride was 80 wt % with respect to the copolymer rubber, to obtain a water-containing crumb. Then the obtained water-containing crumb was water-washed once, separated by filtration, and dried in a vacuum at 60° C. for 12 hours, and thus the carboxyl group-containing nitrile rubber (C) was obtained.

The iodine value, polymer Mooney viscosity (ML1+4, 100° C.), polymer pH, content of sodium, and monomer composition of the obtained carboxyl group-containing nitrile rubber (C) are shown in Table 1.

Preparation of Cross-Linkable Nitrile Rubber Composition

A cross-linkable nitrile rubber composition was prepared in the same manner as in Example 1 except that 100 parts of the carboxyl group-containing nitrile rubber (C) obtained above was used in place of 100 parts of the carboxyl group-containing nitrile rubber (A), and the evaluations were performed in the same manner as in Example 1. The results thus obtained are shown in Table 1.

Example 4

Production of Carboxyl Group-Containing Nitrile Rubber (D)

A latex of a copolymer rubber was obtained by conducting polymerization in the same manner as in Example 1 except that the amount of acrylonitrile used was altered to 23 parts, the amount of 1,3-butadiene used was altered to 42 parts, respectively, and 29 parts of methoxyethyl acrylate was further added. The latex of the hydrogenated copolymer rubber (d) of pH 6.7 was obtained by conducting a hydrogenation reaction in the same manner as in Example 1.

Then, to the latex of the hydrogenated copolymer rubber (d), a 2 wt % aqueous solution of sulfuric acid was added to adjust the pH of the latex of the hydrogenated copolymer rubber (d) to 4, then the temperature of the latex was adjusted to 60° C. To the latex which had been subjected to adjustment of pH and temperature, a 5 wt % aqueous solution of sodium chloride adjusted to pH 2 by a 2 wt % aqueous solution of sulfuric acid was added as a coagulant in such a way that the content of sodium chloride was 80 wt % with respect to the copolymer rubber, to obtain a water-containing crumb. Then the obtained water-containing crumb was water-washed once, separated by filtration, and dried in a vacuum at 60° C. for 12 hours, and thus the carboxyl group-containing nitrile rubber (D) was obtained.

The iodine value, polymer Mooney viscosity (ML1+4, 100° C.), polymer pH, content of sodium, and monomer composition of the obtained carboxyl group-containing nitrile rubber (D) are shown in Table 1.

Preparation of Cross-Linkable Nitrile Rubber Composition

A cross-linkable nitrile rubber composition was prepared in the same manner as in Example 1 except that 100 parts of the carboxyl group-containing nitrile rubber (D) obtained above was used in place of 100 parts of the carboxyl group-containing nitrile rubber (A), and the evaluations were performed in the same manner as in Example 1. The results thus obtained are shown in Table 1.

Example 5

Production of Carboxyl Group-Containing Nitrile Rubber (E)

A latex of a copolymer rubber was obtained by conducting polymerization in the same manner as in Example 1 except that the amount of acrylonitrile used was altered to 15 parts, the amount of 1,3-butadiene used was altered to 44 parts, respectively, and 35 parts of n-butyl acrylate was further added. The latex of the hydrogenated copolymer rubber (e) of pH 6.6 was obtained by conducting a hydrogenation reaction in the same manner as in Example 1.

Then, to the latex of the hydrogenated copolymer rubber (e), a 2 wt % aqueous solution of sulfuric acid was added to adjust the pH of the latex of the hydrogenated copolymer rubber (e) to 4, then the temperature of the latex was adjusted to 60° C. To the latex which had been subjected to adjustment of pH and temperature, a 5 wt % aqueous solution of sodium chloride adjusted to pH 2 by a 2 wt % aqueous solution of sulfuric acid was added as a coagulant in such a way that the content of sodium chloride was 80 wt % with respect to the copolymer rubber, to obtain a water-containing crumb. Then the obtained water-containing crumb was water-washed once, separated by filtration, and dried in a vacuum at 60° C. for 12 hours, and thus the carboxyl group-containing nitrile rubber (E) was obtained.

The iodine value, polymer Mooney viscosity (ML1+4, 100° C.), polymer pH, content of sodium, and monomer composition of the obtained carboxyl group-containing nitrile rubber (E) are shown in Table 1.

Preparation of Cross-Linkable Nitrile Rubber Composition

A cross-linkable nitrile rubber composition was prepared in the same manner as in Example 1 except that 100 parts of the carboxyl group-containing nitrile rubber (E) obtained above was used in place of 100 parts of the carboxyl group-containing nitrile rubber (A), and the evaluations were performed in the same manner as in Example 1. The results thus obtained are shown in Table 1.

Example 6

Production of Carboxyl Group-Containing Nitrile Rubber (F)

The latex of the hydrogenated copolymer rubber (f) of pH 6.6 was obtained by conducting a hydrogenation reaction in the same manner as in Example 5 except that the amount of the palladium catalyst used in the hydrogenation reaction was altered to 1000 ppm by weight as the content of palladium with respect to the latex of the copolymer rubber obtained in the same manner as in Example 5.

Then, to the latex of the hydrogenated copolymer rubber (f), a 2 wt % aqueous solution of sulfuric acid was added to adjust the pH of the latex of the hydrogenated copolymer rubber (f) to 4, then the temperature of the latex was adjusted to 60° C. To the latex which had been subjected to adjustment of pH and temperature, a 5 wt % aqueous solution of sodium chloride adjusted to pH 2 by a 2 wt % aqueous solution of sulfuric acid was added as a coagulant in such a way that the content of sodium chloride was 80 wt % with respect to the copolymer rubber, to obtain a water-containing crumb. Then the obtained water-containing crumb was water-washed once, separated by filtration, and dried in a vacuum at 60° C. for 12 hours, and thus the carboxyl group-containing nitrile rubber (F) was obtained.

The iodine value, polymer Mooney viscosity (ML1+4, 100° C.), polymer pH, content of sodium, and monomer composition of the obtained carboxyl group-containing nitrile rubber (F) are shown in Table 1.

Preparation of Cross-Linkable Nitrile Rubber Composition

A cross-linkable nitrile rubber composition was prepared in the same manner as in Example 1 except that 100 parts of the carboxyl group-containing nitrile rubber (F) obtained above was used in place of 100 parts of the carboxyl group-containing nitrile rubber (A), and the evaluations were performed in the same manner as in Example 1. The results thus obtained are shown in Table 1.

Example 7

Production of Carboxyl Group-Containing Nitrile Rubber (G)

The latex of the hydrogenated copolymer rubber (g) of pH 6.6 was obtained by conducting a hydrogenation reaction in the same manner as in Example 5 except that the amount of the palladium catalyst used in the hydrogenation reaction was altered to 1,300 ppm by weight as the content of palladium with respect to the latex of the copolymer rubber obtained in the same manner as in Example 5.

Then, to the latex of the hydrogenated copolymer rubber (g), a 2 wt % aqueous solution of sulfuric acid was added to adjust the pH of the latex of the hydrogenated copolymer rubber (g) to 4, then the temperature of the latex was adjusted to 60° C. To the latex which had been subjected to adjustment of pH and temperature, a 5 wt % aqueous solution of sodium chloride adjusted to pH 2 by a 2 wt % aqueous solution of sulfuric acid was added as a coagulant in such a way that the content of sodium chloride was 80 wt % with respect to the copolymer rubber, to obtain a water-containing crumb. Then the obtained water-containing crumb was water-washed once, separated by filtration, and dried in a vacuum at 60° C. for 12 hours, and thus the carboxyl group-containing nitrile rubber (G) was obtained.

The iodine value, polymer Mooney viscosity (ML1+4, 100° C.), polymer pH, content of sodium, and monomer composition of the obtained carboxyl group-containing nitrile rubber (G) are shown in Table 1.

Preparation of Cross-Linkable Nitrile Rubber Composition

A cross-linkable nitrile rubber composition was prepared in the same manner as in Example 1 except that 100 parts of the carboxyl group-containing nitrile rubber (G) obtained above was used in place of 100 parts of the carboxyl group-containing nitrile rubber (A), and the evaluations were performed in the same manner as in Example 1. The results thus obtained are shown in Table 1.

Example 8

Production of Carboxyl Group-Containing Nitrile Rubber (H)

To the latex of the hydrogenated copolymer rubber (a) obtained in the same manner as in Example 1, a 2 wt % aqueous solution of sulfuric acid was added to adjust the pH of the latex of the hydrogenated copolymer rubber (a) to 2.5, then the temperature of the latex was adjusted to 60° C. To the latex which had been subjected to adjustment of pH and temperature, a 5 wt % aqueous solution of sodium chloride adjusted to pH 2 by a 2 wt % aqueous solution of sulfuric acid was added as a coagulant in such a way that the content of sodium chloride was 80 wt % with respect to the copolymer rubber, to obtain a water-containing crumb. Then the obtained water-containing crumb was water-washed once, separated by filtration, and dried in a vacuum at 60° C. for 12 hours, and thus the carboxyl group-containing nitrile rubber (H) was obtained.

The iodine value, polymer Mooney viscosity (ML1+4, 100° C.), polymer pH, content of sodium, and monomer composition of the obtained carboxyl group-containing nitrile rubber (H) are shown in Table 1.

Preparation of Cross-Linkable Nitrile Rubber Composition

A cross-linkable nitrile rubber composition was prepared in the same manner as in Example 1 except that 100 parts of the carboxyl group-containing nitrile rubber (H) obtained above was used in place of 100 parts of the carboxyl group-containing nitrile rubber (A), and the evaluations were performed in the same manner as in Example 1. The results thus obtained are shown in Table 1.

Comparative Example 1

Production of Carboxyl Group-Containing Nitrile Rubber (I)

Then, to the latex of the hydrogenated copolymer rubber (a) obtained in the same manner as in Example 1, a 2 wt % aqueous solution of potassium hydroxide was added to adjust the pH of the latex of the hydrogenated copolymer rubber (a) to 10, then the temperature of the latex was adjusted to 60° C. To the latex which had been subjected to adjustment of pH and temperature, a 5 wt % aqueous solution of sodium chloride was added as a coagulant in such a way that the content of sodium chloride was 80 wt % with respect to the copolymer rubber, to obtain a water-containing crumb. Then the obtained water-containing crumb was water-washed once, separated by filtration, and dried in a vacuum at 60° C. for 12 hours, and thus the carboxyl group-containing nitrile rubber (I) was obtained.

The iodine value, polymer Mooney viscosity (ML1+4, 100° C.), polymer pH, content of sodium, and monomer composition of the obtained carboxyl group-containing nitrile rubber (I) are shown in Table 1.

Preparation of Cross-Linkable Nitrile Rubber Composition

A cross-linkable nitrile rubber composition was prepared in the same manner as in Example 1 except that 100 parts of the carboxyl group-containing nitrile rubber (I) obtained above was used in place of 100 parts of the carboxyl group-containing nitrile rubber (A), and the evaluations were performed in the same manner as in Example 1. The results thus obtained are shown in Table 1.

Comparative Example 2

Production of Carboxyl Group-Containing Nitrile Rubber (J)

The latex of the hydrogenated copolymer rubber (a) obtained in the same manner as in Example 1 was used, and the temperature of the latex was adjusted to 60° C. without pH adjustment. To the latex which had been subjected to adjustment of temperature (i.e., the latex pf pH 6.8), a 5 wt % aqueous solution of sodium chloride was added as a coagulant in such a way that the content of sodium chloride was 80 wt % with respect to the copolymer rubber, to obtain a water-containing crumb. Then the obtained water-containing crumb was water-washed once, separated by filtration, and dried in a vacuum at 60° C. for 12 hours, and thus the carboxyl group-containing nitrile rubber (J) was obtained.

The iodine value, polymer Mooney viscosity (ML1+4, 100° C.), polymer pH, content of sodium, and monomer composition of the obtained carboxyl group-containing nitrile rubber (J) are shown in Table 1.

Preparation of Cross-Linkable Nitrile Rubber Composition

A cross-linkable nitrile rubber composition was prepared in the same manner as in Example 1 except that 100 parts of the carboxyl group-containing nitrile rubber (J) obtained above was used in place of 100 parts of the carboxyl group-containing nitrile rubber (A), and the evaluations were performed in the same manner as in Example 1. The results thus obtained are shown in Table 1.

Comparative Example 3

Production of Carboxyl Group-Containing Nitrile Rubber (K)

To the latex of the hydrogenated copolymer rubber (a) obtained in the same was as in Example 1, a 2 wt % aqueous solution of sulfuric acid was added to adjust the pH of the latex of the hydrogenated copolymer rubber (a) to 4.2, then the temperature of the latex was adjusted to 60° C. To the latex which had been subjected to adjustment of pH and temperature, a 5 wt % aqueous solution of magnesium sulfate was added as a coagulant in such a way that the content of magnesium sulfate was 50 wt % with respect to the copolymer rubber, to obtain a water-containing crumb. Then the obtained water-containing crumb was water-washed once, separated by filtration, and dried in a vacuum at 60° C. for 12 hours, and thus the carboxyl group-containing nitrile rubber (K) was obtained.

The iodine value, polymer Mooney viscosity (ML1+4, 100° C.), polymer pH, content of sodium, and monomer composition of the obtained carboxyl group-containing nitrile rubber (K) are shown in Table 1.

Preparation of Cross-Linkable Nitrile Rubber Composition

A cross-linkable nitrile rubber composition was prepared in the same manner as in Example 1 except that 100 parts of the carboxyl group-containing nitrile rubber (K) obtained above was used in place of 100 parts of the carboxyl group-containing nitrile rubber (A), and the evaluations were performed in the same manner as in Example 1. The results thus obtained are shown in Table 1.

Comparative Example 4

Production of Carboxyl Group-Containing Nitrile Rubber (L)

To the latex of the hydrogenated copolymer rubber (a) obtained in the same manner as in Example 1, a 2 wt % aqueous solution of potassium hydroxide was added to adjust the pH of the latex of the hydrogenated copolymer rubber (a) to 10, then the temperature of the latex was adjusted to 60° C. To the latex which had been subjected to adjustment of pH and temperature, a 5 wt % aqueous solution of magnesium sulfate was added as a coagulant in such a way that the content of magnesium sulfate was 50 wt % with respect to the copolymer rubber, to obtain a water-containing crumb. Then the obtained water-containing crumb was water-washed once, separated by filtration, and dried in a vacuum at 60° C. for 12 hours, and thus the carboxyl group-containing nitrile rubber (L) was obtained.

The iodine value, polymer Mooney viscosity (ML1+4, 100° C.), polymer pH, content of sodium, and monomer composition of the obtained carboxyl group-containing nitrile rubber (L) are shown in Table 1.

Preparation of Cross-Linkable Nitrile Rubber Composition

A cross-linkable nitrile rubber composition was prepared in the same manner as in Example 1 except that 100 parts of the carboxyl group-containing nitrile rubber (L) obtained above was used in place of 100 parts of the carboxyl group-containing nitrile rubber (A), and the evaluations were performed in the same manner as in Example 1. The results thus obtained are shown in Table 1.

Comparative Example 5

Production of Carboxyl Group-Containing Nitrile Rubber (M)

The latex of the hydrogenated copolymer rubber (e) obtained in the same manner as in Example 5 was used, and the temperature of the latex was adjusted to 60° C. without pH adjustment. To the latex which had been subjected to adjustment of temperature (i.e., the latex pf pH 6.6), a 5 wt % aqueous solution of sodium chloride was added as a coagulant in such a way that the content of sodium chloride was 80 wt % with respect to the copolymer rubber, to obtain a water-containing crumb. Then the obtained water-containing crumb was water-washed once, separated by filtration, and dried in a vacuum at 60° C. for 12 hours, and thus the carboxyl group-containing nitrile rubber (M) was obtained.

The iodine value, polymer Mooney viscosity (ML1+4, 100° C.), polymer pH, content of sodium, and monomer composition of the obtained carboxyl group-containing nitrile rubber (M) are shown in Table 1.

Preparation of Cross-Linkable Nitrile Rubber Composition

A cross-linkable nitrile rubber composition was prepared in the same manner as in Example 1 except that 100 parts of the carboxyl group-containing nitrile rubber (M) obtained above was used in place of 100 parts of the carboxyl group-containing nitrile rubber (A), and the evaluations were performed in the same manner as in Example 1. The results thus obtained are shown in Table 1.

TABLE 1

| | | | | | | Examples | | | | |
|---|---|---|---|---|---|---|---|---|---|---|
| | | | 1 | 2 | 3 | 4 | 5 | 6 | 7 |
| Carboxyl group-containing nitrile rubber | | | | | | | | | | |
| Rubber composition | Acrylonitrile unit | wt % | 36 | 20 | 43 | 24 | 16 | 16 | 16 |
| | Butadiene unit (including hydrogenated fraction) | wt % | 59 | 45 | 51 | 45 | 46 | 46 | 46 |
| | n-Butyl acrylate unit | wt % | | 31 | | | 33 | 33 | 33 |
| | Methoxyethyl acrylate unit | wt % | | | | 25 | | | |
| | Mono-n-butyl maleate unit | wt % | 5 | 4 | 6 | 6 | 5 | 5 | 5 |
| | Iodine value | | 8 | 10 | 9 | 7 | 10 | 58 | 42 |
| | Polymer Mooney viscosity [ML1 + 4, 100° C.] | | 45 | 30 | 41 | 48 | 45 | 37 | 39 |
| | Polymer pH | | 6.0 | 6.4 | 6.2 | 6.3 | 6.0 | 6.2 | 6.1 |
| | Content of sodium | (ppm by weight) | 2120 | 980 | 1540 | 2320 | 1790 | 1680 | 1650 |
| | Type of a coagulant used in coagulation | | NaCl | NaCl | NaCl | NaCl | NaCl | NaCl | NaCl |
| Evaluation of a cross-linkable nitrile rubber composition | | | | | | | | | | |
| | Compound Mooney viscosity [ML1 + 4, 100° C.] | | 106 | 82 | 82 | 104 | 69 | 65 | 70 |
| Evaluation of cross-linked rubber | | | | | | | | | | |
| | Tensile strength | (MPa) | 21 | 19 | 23 | 18 | 17 | 16 | 15 |
| | Elongation | (%) | 210 | 180 | 260 | 150 | 170 | 150 | 150 |
| | Hardness (Duro A) | | 71 | 71 | 75 | 74 | 71 | 71 | 70 |
| | Compression set | (%) | 45 | 49 | 48 | 36 | 35 | 44 | 40 |
| | Water resistance (Volume change rate before and after immersion in water) | (%) | 13 | 11 | 12 | 14 | 11 | 10 | 12 |

| | | | Examples | Comparative Examples | | | | |
|---|---|---|---|---|---|---|---|---|
| | | | 8 | 1 | 2 | 3 | 4 | 5 |
| Carboxyl group-containing nitrile rubber | | | | | | | | |
| Rubber composition | Acrylonitrile unit | wt % | 36 | 36 | 36 | 36 | 36 | 16 |
| | Butadiene unit (including hydrogenated fraction) | wt % | 59 | 59 | 59 | 59 | 59 | 46 |
| | n-Butyl acrylate unit | wt % | | | | | | 33 |
| | Methoxyethyl acrylate unit | wt % | | | | | | |
| | Mono-n-butyl maleate unit | wt % | 5 | 5 | 5 | 5 | 5 | 5 |
| | Iodine value | | 8 | 8 | 8 | 8 | 8 | 58 |
| | Polymer Mooney viscosity [ML1 + 4, 100° C.] | | 44 | 54 | 51 | 85 | 92 | 40 |
| | Polymer pH | | 4.0 | 10.1 | 7.9 | 6.5 | 10.3 | 7.8 |
| | Content of sodium | | 880 | 29800 | 15100 | 98 | 202 | 14700 |
| | Type of a coagulant used in coagulation | (ppm by weight) | NaCl | NaCl | NaCl | MgSO$_4$ | MgSO$_4$ | NaCl |
| Evaluation of a cross-linkable nitrile rubber composition | | | | | | | | |
| | Compound Mooney viscosity [ML1 + 4, 100° C.] | | 103 | 162 | 128 | 201 | 251 | 80 |
| Evaluation of cross-linked rubber | | | | | | | | |
| | Tensile strength | (MPa) | 22 | 21 | 19 | 20 | 22 | 17 |
| | Elongation | (%) | 200 | 210 | 220 | 200 | 200 | 150 |
| | Hardness (Duro A) | | 70 | 71 | 72 | 73 | 71 | 70 |
| | Compression set | (%) | 43 | 47 | 46 | 55 | 57 | 45 |
| | Water resistance (Volume change rate before and after immersion in water) | (%) | 11 | 25 | 20 | 7 | 8 | 20 |

As shown in Table 1, the carboxyl group-containing nitrile rubber comprising an α,β-ethylenically unsaturated nitrile monomer unit in a content of 5-60 wt % and having an iodine value of 120 or less, a polymer Mooney viscosity of 60 or less and a polymer pH of 7 or less had a low viscosity (compound Mooney viscosity) and an excellent formability when a cross-linking agent was added, and also could give a cross-linked rubber excellent in the original state physical properties, compression set resistance and water resistance (Examples 1-8).

On the other hand, the carboxyl group-containing nitrile rubber obtained by using sodium chloride as a coagulant and having a polymer pH more than 7 had a high viscosity when a cross-linking agent was added (compound Mooney viscosity) and an inferior formability, and the obtained cross-linked rubber was inferior in the water resistance (Comparative Examples 1, 2, 5).

Also, any of the carboxyl group-containing nitrile rubber obtained by using magnesium sulfate as a coagulant had a polymer Mooney viscosity more than 60, high viscosity when a cross-linking agent was added (compound Mooney viscosity) and an inferior formability, and the obtained cross-linked rubber was inferior in the compression set resistance (Comparative Examples 3, 4).

The invention claimed is:

1. A carboxyl group-containing nitrile rubber comprising an α,β-ethylenically unsaturated nitrile monomer unit in a content of 5 to 60 wt %, and an α,β-ethylenically unsaturated monocarboxylic acid monomer unit in a content of 13 to 53 wt %, and having an iodine value of 120 or less, wherein the carboxyl group-containing nitrile rubber has a polymer Mooney viscosity (ML1+4, 100° C.) of 60 or less and a polymer pH of 7 or less, wherein a content of sodium in the carboxyl group-containing nitrile rubber is from 300 ppm to 10,000 ppm by weight.

2. The carboxyl group-containing nitrile rubber according to claim 1, comprising a carboxyl group-containing monomer unit in a content of 1 to 30 wt %.

3. The carboxyl group-containing nitrile rubber according to claim 1, comprising a conjugated diene monomer unit in a content of 20 to 89.9 wt %.

4. A cross-linkable nitrile rubber composition comprising the carboxyl group-containing nitrile rubber according to claim 1 and a cross-linking agent.

5. A cross-linked rubber prepared by cross-linking the cross-linkable nitrile rubber composition according to claim 4.

6. A method for producing the carboxyl group-containing nitrile rubber according to claim 1, comprising adding a salt of a monovalent cation to a latex of the carboxyl group-containing nitrile rubber to coagulate the carboxyl group-containing nitrile rubber.

7. The method for producing the carboxyl group-containing nitrile rubber according to claim 6, wherein the salt is sodium chloride, sodium nitrate, or sodium sulfate.

8. The method for producing the carboxyl group-containing nitrile rubber according to claim 6, wherein a pH of the latex is 5.5 or less.

9. The method for producing the carboxyl group-containing nitrile rubber according to claim 6, further comprising, after the coagulation of the carboxyl group-containing nitrile rubber, water-washing a water-containing crumb of the carboxyl group-containing nitrile rubber obtained by coagulation.

* * * * *